United States Patent [19]
Kim

[11] Patent Number: 5,301,015
[45] Date of Patent: Apr. 5, 1994

[54] NTSC AND PAL COMPATIBLE DIGITAL ENCODER

[75] Inventor: Sung-Hoon Kim, Suwon, Rep. of Korea

[73] Assignee: Samsung Electronics Co., Ltd., Kyungki, Rep. of Korea

[21] Appl. No.: 980,276

[22] Filed: Nov. 23, 1992

[30] Foreign Application Priority Data

Nov. 27, 1991 [KR] Rep. of Korea ............... 1991-21420

[51] Int. Cl.$^5$ ............... H04N 11/14; H04N 9/45; H04N 9/65; H04N 9/66
[52] U.S. Cl. ............... 348/493; 348/505; 348/724; 348/642; 348/441
[58] Field of Search ............... 358/19, 17, 18, 16, 358/23, 24, 12, 11, 13, 150, 28, 310; H04N 11/14, 9/45, 9/65, 9/66, 11/06

[56] References Cited

U.S. PATENT DOCUMENTS

| | | | |
|---|---|---|---|
| 4,217,603 | 8/1980 | Hjortzberg | 358/12 |
| 4,355,327 | 10/1982 | Nagumo et al. | 358/13 X |
| 4,547,796 | 10/1985 | Iwase et al. | 358/13 |
| 4,574,302 | 3/1986 | Mackereth | 358/12 X |
| 4,620,222 | 10/1986 | Baba et al. | 358/48 |
| 4,982,179 | 1/1991 | Ogawa et al. | 358/23 X |
| 5,216,496 | 6/1993 | Miyamoto et al. | 358/11 X |

FOREIGN PATENT DOCUMENTS

| | | | |
|---|---|---|---|
| 58-001390 | 1/1983 | Japan | 358/23 |
| 2-141679 | 5/1990 | Japan | G01R 31/28 |

Primary Examiner—James J. Groody
Assistant Examiner—Safet Metjahic
Attorney, Agent, or Firm—Sughrue, Mion, Zinn, Macpeak & Seas

[57] ABSTRACT

A digital encoder for use in both NTSC and PAL systems includes a demultiplexer for separating a time-division color difference signal R-Y/B-Y into color difference signals R-Y and B-Y. The separated color difference signals R-Y and B-Y are converted by a sub-carrier frequency converter into a sub-carrier frequency, and a digital modulator determines levels and phases of the converted color difference signals. A burst generating circuit generates a burst signal after determining a level and phase of the burst signal, and a chroma encoder produces a chroma signal by mixing an output of the digital modulator with the burst signal.

19 Claims, 6 Drawing Sheets

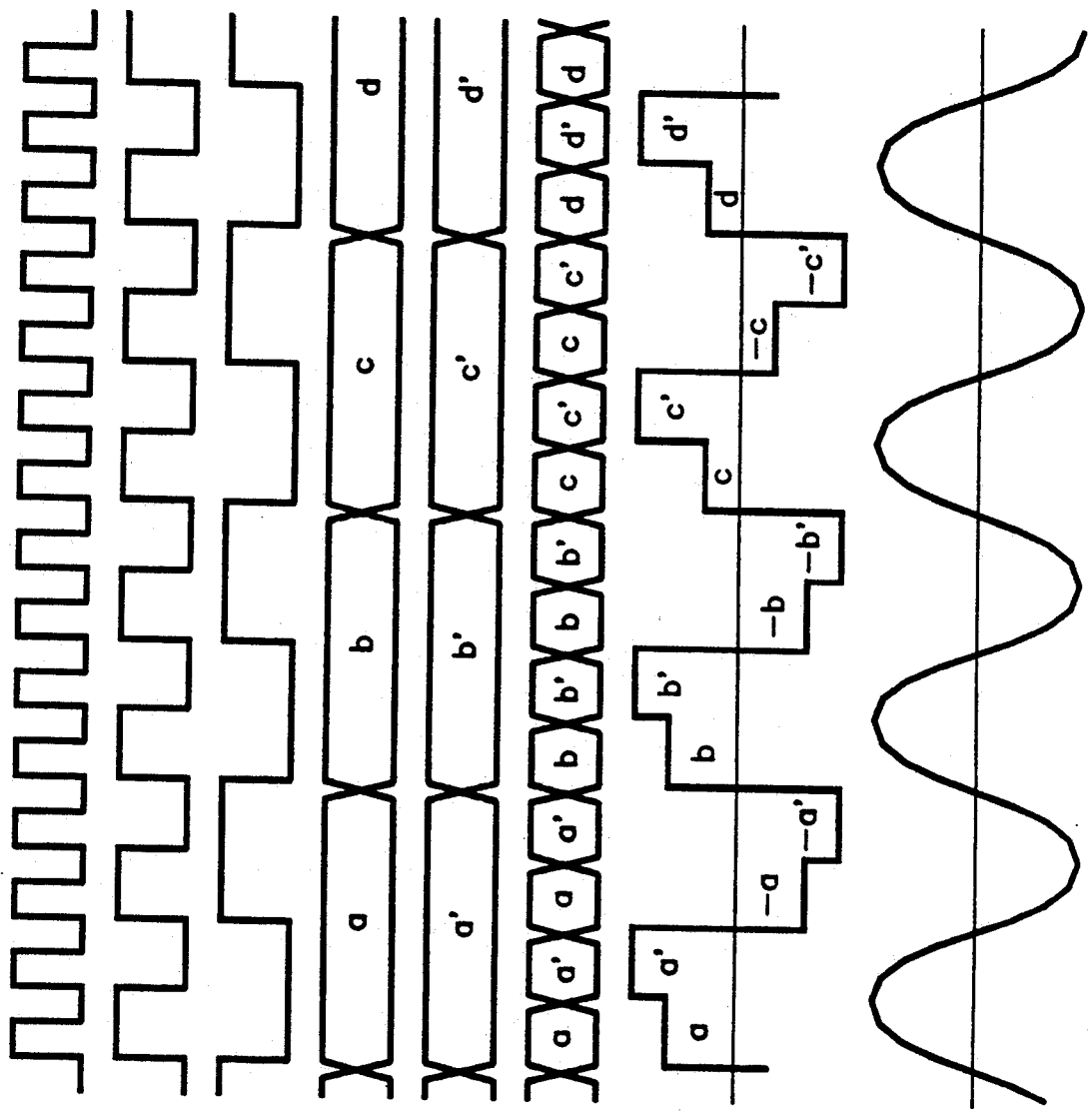

NTSC AND PAL COMPATIBLE DIGITAL ENCODER

BACKGROUND OF THE INVENTION

The present invention relates, in general, to the digital processing of signals and, more particularly, to a digital encoder applicable in, for example, cameras for both home and industrial uses.

The recent trend in camera design is to include more digital components. That is, the analog components within a conventional camera are being converted to digital components. Digital cameras have many uses in industry and home and, as an example, such digital cameras are used for surveillance. One component of a digital camera is a digital encoder, which is necessary for processing the digital chrominance and luminance signals and generating a suitable burst signal. However, conventional digital encoders have many drawbacks and disadvantages

SUMMARY OF THE INVENTION

Therefore, it is an object of the present invention to provide a digital encoder for modulating the levels and phases of color difference signals.

It is an another object of the present invention to provide a compatible digital encoder for use in both NTSC (National Television System Committee) and PAL (Phase Alternation by Line) type systems by variegating the levels and phases of color difference and burst signals.

The above and other objects of the present invention are accomplished by providing a digital encoder including a frequency converter for converting color difference signals into a sub-carrier frequency, a modulator, coupled to the frequency converter and responsive to converted color difference signals, for determining a level and phase of the converted color difference signal in response to a first set of control signals, a register having phase information corresponding to a burst signal, a burst generating circuit, coupled to the register and responsive to the phase information, for determining a level and phase of the burst signal in response to a second set of control signals, and a chroma encoder, responsive to outputs of the modulator and the burst generating circuit, for generating a chrominance signal in response to a third set of control signals.

Further in accordance with the above objects, the present invention provides a digital encoder including a frequency converting circuit for converting a color difference signal into a sub-carrier frequency. A digital modulator determines a level and phase of a converted color difference signal in response to a first set of control signals, and a burst generator determines a level and phase of the burst signal in response to a second set of control signals. A chroma encoder receives outputs of the digital modulator and the burst generator, and generates a chrominance signal in response to a third set of control signals.

Even further in accordance with the above objects, the present invention provides a digital modulator for inverting color difference signals for every other horizontal synchronizing signal in response to a line alternate signal.

Still, further in accordance with the above objects, the present invention provides a burst generating circuit which controls, in response to the line alternate signal, a switching operation of data supplied from registers, so as to determine a level and phase of the burst signal.

BRIEF DESCRIPTION OF THE DRAWINGS

For a better understanding of the invention, reference will now be made, by way of example only, to the accompanying drawings, in which:

FIGS. 4A to 4H are waveforms of signals at particular locations of FIGS. 1 and 2;

DETAILED DESCRIPTION OF THE PREFERRED EMBODIMENTS

Figure 1:
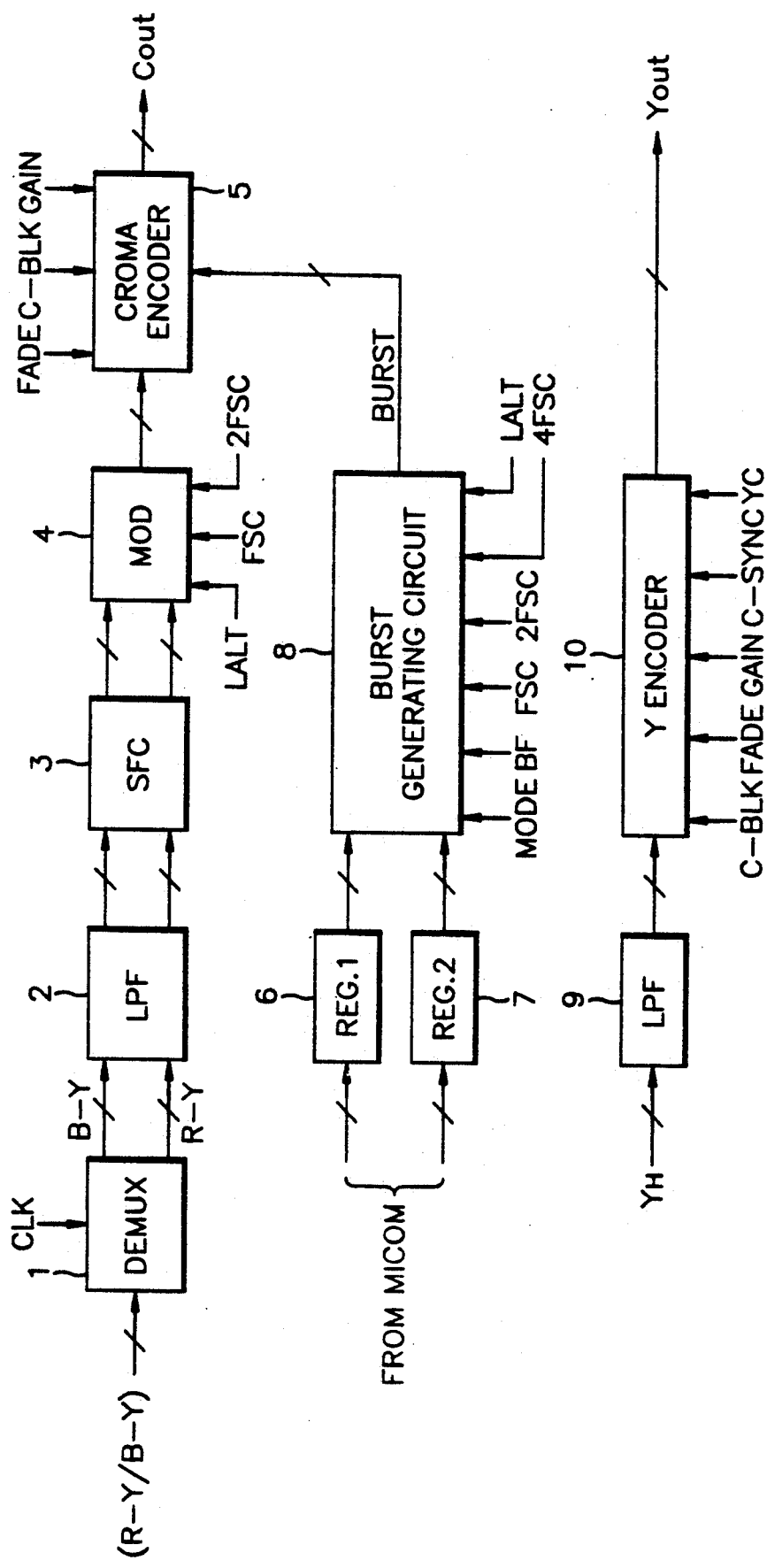
FIG. 1 is a schematic block diagram of a digital encoder according to the present invention.

Referring to FIG. 1, a time-division digital color difference signal R-Y/B-Y is applied to a demultiplexer 1 and separated into two color difference signals B-Y and R-Y. A clock signal CLK is input to the demultiplexer 1 for controlling the separation of the color difference signals B-Y and R-Y. The clock signal CLK has a frequency of at least twice the frequency of the signals R-Y and B-Y so that the separation is performed with minimal distortion. The two separated signals R-Y and B-Y output from the demultiplexer 1 are supplied to a sub-carrier frequency converter 3 through a low-pass filter 2, and converted into a sub-carrier frequency. A digital modulator 4 modulates and compresses the frequency converted signals in response to a line alternate signal LALT, a sub-carrier frequency signal FSC, and a twice sub-carrier frequency signal 2FSC. A modulated and compressed signal is output by the digital modulator and provided to a chroma encoder 5.

At the same time, a burst generating circuit 8 receives, from registers 6 and 7, data having phase information pertaining to NTSC and/or PAL type systems respectively and control signals including the line alternate signal LALT, the sub-carrier frequency signal FSC, the twice sub-carrier frequency signal 2FSC, a four times sub-carrier frequency signal 4FSC, a burst flag signal BF, and a mode select signal MODE, which selects an NTSC or PAL type system. The burst generating circuit 8, in response to the phase data and control signals, generates a burst signal BURST, which is output to the chroma encoder 5.

Based on the modulated and compressed signal from the digital modulator 4 and the burst signal BURST, the chroma encoder 5 produces a digital chrominance signal $C_{out}$ in response to control signals including a fade signal FADE, a composite blank signal C-BLK, and a gain signal GAIN.

A luminance signal $Y_H$ is applied to a luminance encoder 10 through a low-pass filter 9, and the luminance encoder 10 generates a digital luminance signal $Y_{out}$ in response to the control signals, such as the fade signal FADE, the gain signal GAIN, a composite synchronizing signal C-SYNC, the composite blank signal C-BLK, and a luminance control signal YC.

Figure 2:
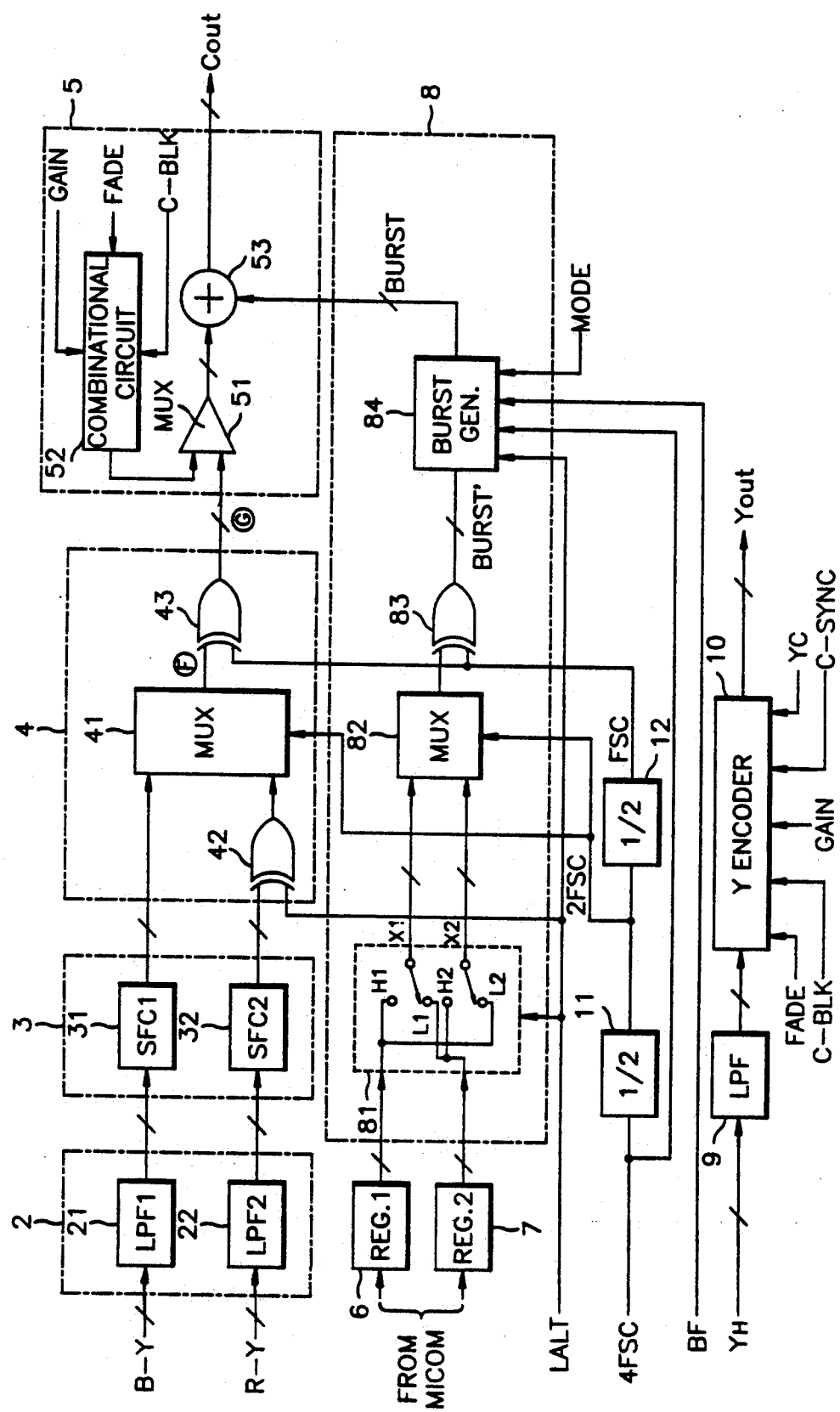
FIG. 2 is a block diagram showing a preferred embodiment of FIG. 1.

FIG. 2, shows a first preferred embodiment of FIG. 1. Here, the signals B-Y and R-Y, after being separated by the demultiplexer 1, are supplied to low-pass filters 21 and 22, which pass the separated signals B-Y and R-Y having a frequency below a predetermined frequency threshold. If the frequency (clock frequency) of the input signal to the digital modulator 4 is not the same as the sub-carrier frequency, effective modulation cannot be accomplished. Thus, the frequencies of the separated signals R-Y and B-Y are respectively converted into a sub-carrier frequency through the sub-carrier frequency converters 31 and 32 and, then, the converted signals are supplied to the digital modulator 4. The output signal from the sub-carrier frequency converter 31 is coupled directly to a multiplexer 41 of the digital modulator 4. On the other hand, the output signal from the sub-carrier frequency converter 32 is coupled to the multiplexer 41 via an exclusive-OR gate 42, whose second input is coupled to the line alternate signal LALT.

If the digital encoder according to the present invention is used in an NTSC type system, the line alternate signal LALT will be at a logic "low" state, which will cause the exclusive-OR gate 42 to operate as a buffer. However, if the digital encoder is used in a PAL type system, the line alternate signal LALT will alternate at logic "high" and logic "low" states for every horizontal synchronizing signal. Accordingly, the exclusive-OR gate 42 will operate as a buffer and an inverter alternatively, so that the level and phase of the signal R-Y are alternatively inverted and not inverted for every horizontal synchronizing signal.

The multiplexer 41, which receives the output signal of the sub-carrier frequency converter 31 and the output of the exclusive-OR gate 42, operates in response to the signal 2FSC output by a first frequency divider 11. The frequency divider 11 divides the signal 4FSC by two thus producing the signal 2FSC. The signal 2FSC is again divided by two by a second frequency divider 12 to produce the signal FSC. The signal FSC and an output of the multiplexer 41 are respectively applied to first and second inputs of an exclusive-OR gate 43. An output of the exclusive-OR gate 43 is coupled to a multiplexer 51 within the chroma encoder 5. Hence, depending on the logic level of the signal FSC, the exclusive-OR gate 43 will operate as an inverter or a buffer when the signal FSC is at a logic "high" or logic "low" state so that the level and phase of the output of the multiplexer 41 is alternatively inverted and not inverted. As a result, the color difference signals B-Y and R-Y are digitally modulated in the digital encoder. The multiplexer 51 of the chroma encoder 5 supplies the output thereof to a mixer 53 in response to the control signals including the fade signal FADE, the composite blank signal C-BLK, and the gain signal GAIN.

The registers 6 and 7 which provide phase information of the burst signal are connected to a multiplexer 82 of the burst generating circuit 8 through a switch 81 which operates in response to the line alternate signal LALT. When the digital encoder is used in an NTSC type system, the line alternate signal LALT is at a logic "low" state so that the output terminals X1 and X2 of the switch 81 are coupled to the input contact terminals L1 and L2 so as to transmit data of the registers 6 and 7 to the multiplexer 82. However, in a PAL type system, the line alternate signal LALT alternates between logic "high" and a logic "low" state for every horizontal synchronizing signal. As a result, the output terminals X1 and X2 of the switch 81 are alternatively coupled to input contact terminals H1 and H2 and input contact terminals L1 and L2 so that the level and phase of the outputs of the registers 6 and 7 supplied to the multiplexer 82 are inverted for every other horizontal synchronizing signal.

The output of the multiplexer 82 is coupled to a first input of an exclusive-OR gate 83, whose second input is coupled to the sub-carrier frequency signal FSC. In this case, if the signal FSC is at a logic "high" state, the exclusive-OR gate 83 operates as an inverter, and if the signal FSC is at a logic "low" state, the exclusive-OR gate 83 operates as a buffer. Therefore, since the phase and level of the output of the exclusive-OR gate 83 changes every horizontal synchronizing signal, the phase and level of the burst signal are adjusted, accordingly.

A signal BURST' generated by the exclusive-OR gate 83 is coupled to a burst generator 84, which, in response to the line alternate signal LALT, the signal 4FSC, the burst flag signal BF, and the signal MODE, generates a burst signal BURST applicable in both NTSC and PAL type systems. In both an NTSC and PAL type system, the burst signal BURST generated by the burst generator 84 is coupled to an input of the mixer 53 of the chroma encoder 5 and mixed with the output signal of the multiplexer 51 of the chroma encoder 5. The mixed signals thus provide the digital chrominance signal $C_{out}$.

Figure 3:
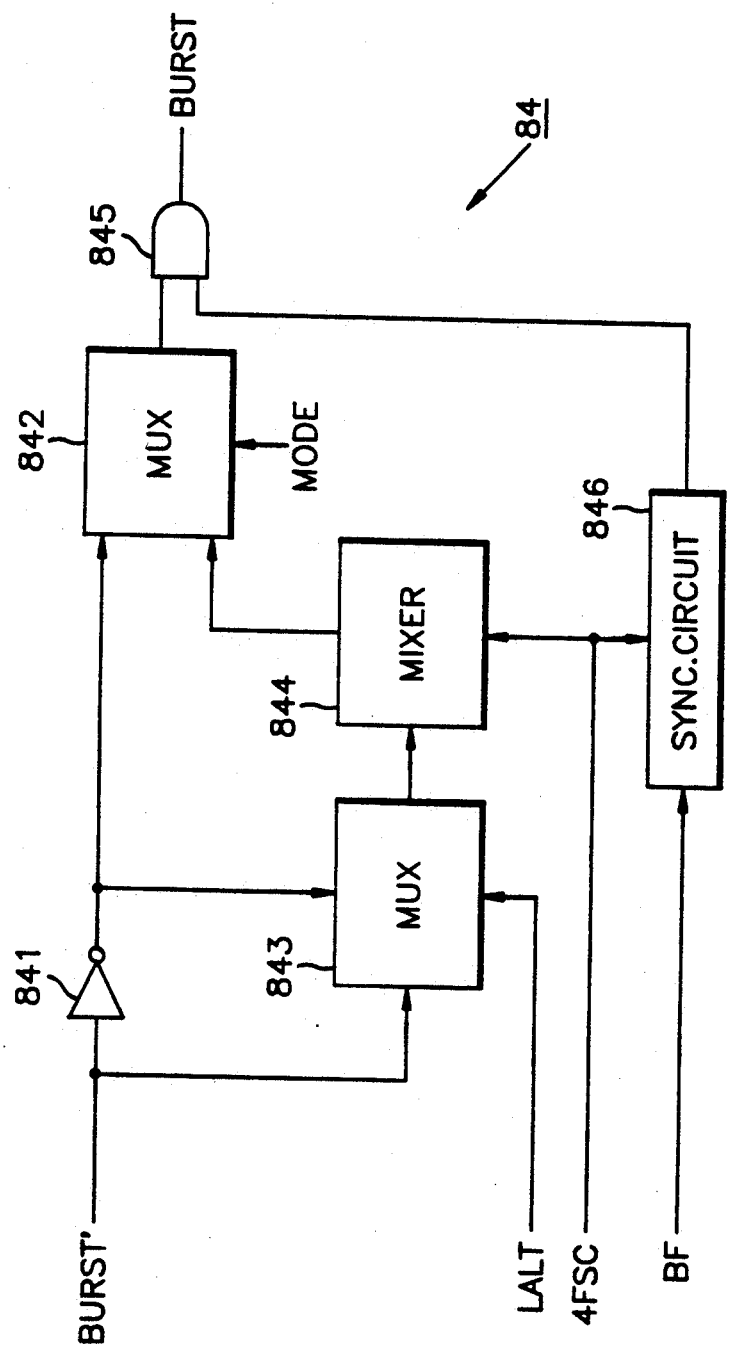
FIG. 3 is a detailed block diagram of a burst generator shown in FIG. 2.

A detailed example of the burst generator 84 is illustrated in FIG. 3. The signal BURST' is coupled to first inputs of multiplexers 842 and 843 via an inverter 841 and directly coupled to a second input of the multiplexer 843. An output of the multiplexer 843 is supplied to a mixer 844 in response to the line alternate signal LALT. The mixer 844 combines the output of the multiplexer 843 with the signal 4FSC, and the output thereof is applied to a second input of the multiplexer 842, which is responsive to the mode signal MODE. An output of the multiplexer 842 is supplied to a first input of an AND gate 845, whose second input is coupled to the burst flag signal BF, which is synchronized with the signal 4FSC through a synchronizing circuit 846. The burst flag signal BF is in an active state during a burst period. As a result, if the digital encoder is used in an NTSC type system, since the signal LALT will be at a logic "low" state, the AND gate 845 will generate the burst signal BURST. However, if the digital encoder is used in a PAL type system, since the signal LALT alternates between logic "high" and logic "low" states for every horizontal synchronizing signal, the burst signal BURST is produced every other horizontal synchronizing signal because the output of the multiplexer 842 is inverted every other horizontal synchronizing signal.

FIGS. 4A, 4B, and 4C respectively show the signals 4FSC, 2FSC, and FSC, the latter two signals being produced by the two frequency dividers 11 and 12. FIG. 4D and 4E respectively illustrate the signals B-Y and R-Y, which are output by the sub-carrier frequency converter 3 and input to the modulator 4. FIG. 4F shows the output of the multiplexer 4. FIG. 4G illustrates a converted analog output of the exclusive-OR gate 43, that is, the digital output of the exclusive-OR gate 43 converted into an analog waveform. FIG. 4H illustrates a waveform obtained when the analog waveform of FIG. 4G is passed through a low-pass filter.

Figure 5A:
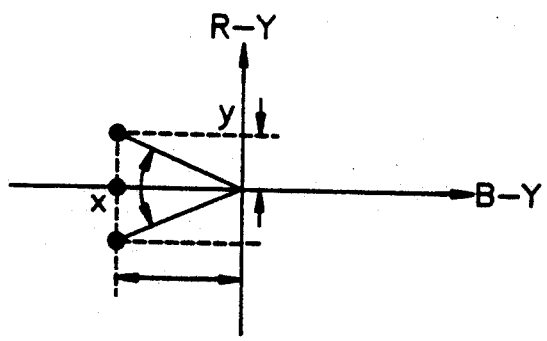
FIGS. 5A to 5C illustrate vector diagrams showing phases of a burst signal.
Figure 5B:
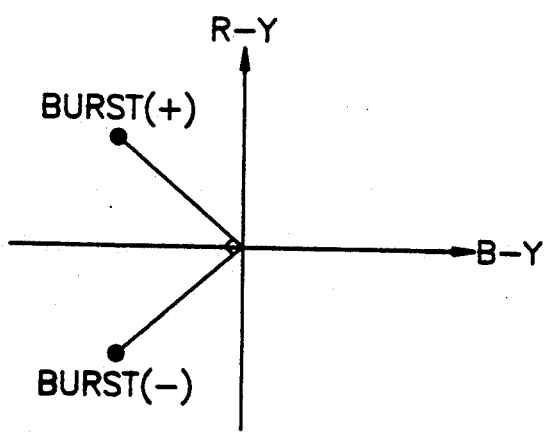
Figure 5C:
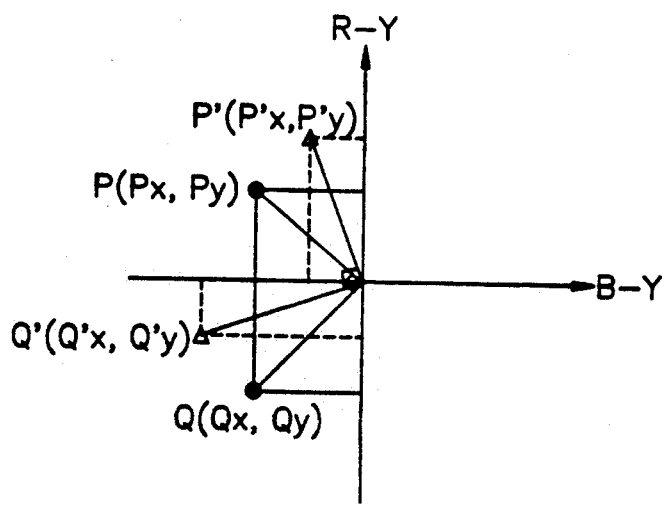

FIG. 5A illustrates data supplied by the registers 6 and 7 respectively, when the digital encoder is used in an NTSC type system. Here, the registers 6 and 7 have an R-Y component and a B-Y component of the burst signal, respectively. Further, since the line alternate signal LALT is set to a logic "low" state, the phase of the burst signal can be easily adjusted. However, where the digital encoder is used in a PAL type system, since the line alternate signal LALT varies between a logic "high" and logic "low" state for every horizontal synchronizing signal, the R-Y component of the burst signal is inverted as shown in FIG. 5B. In a PAL type system, since the phase difference between burst signals BURST+ and BURST- must be maintained at 90°, the outputs of the registers 6 and 7 are altered in response to the signal LALT. FIG. 5C shows that the burst signals maintain a phase difference of 90° when the digital encoder is used in a PAL type system. The burst signals P and Q have a phase difference of 90° relative to one another for use in a PAL type system. If it is desired to have burst signals of P' and Q' while maintaining the phase difference of 90°, $P(P_x, P_y)$ and $Q(Q_x, Q_y)$ should be changed to $P'(P_x, P_y)$ and $Q'(Q_x, Q_y)$ respectively. In this case, following relationships are satisfied:

$$Q'_x = P'_y \text{ and } P'_x = Q'_y.$$

That is, this result coincides with that obtained when the outputs of the registers 6 and 7 are altered in the switch 81 in response to the line alternate signal LALT.

Figure 6:
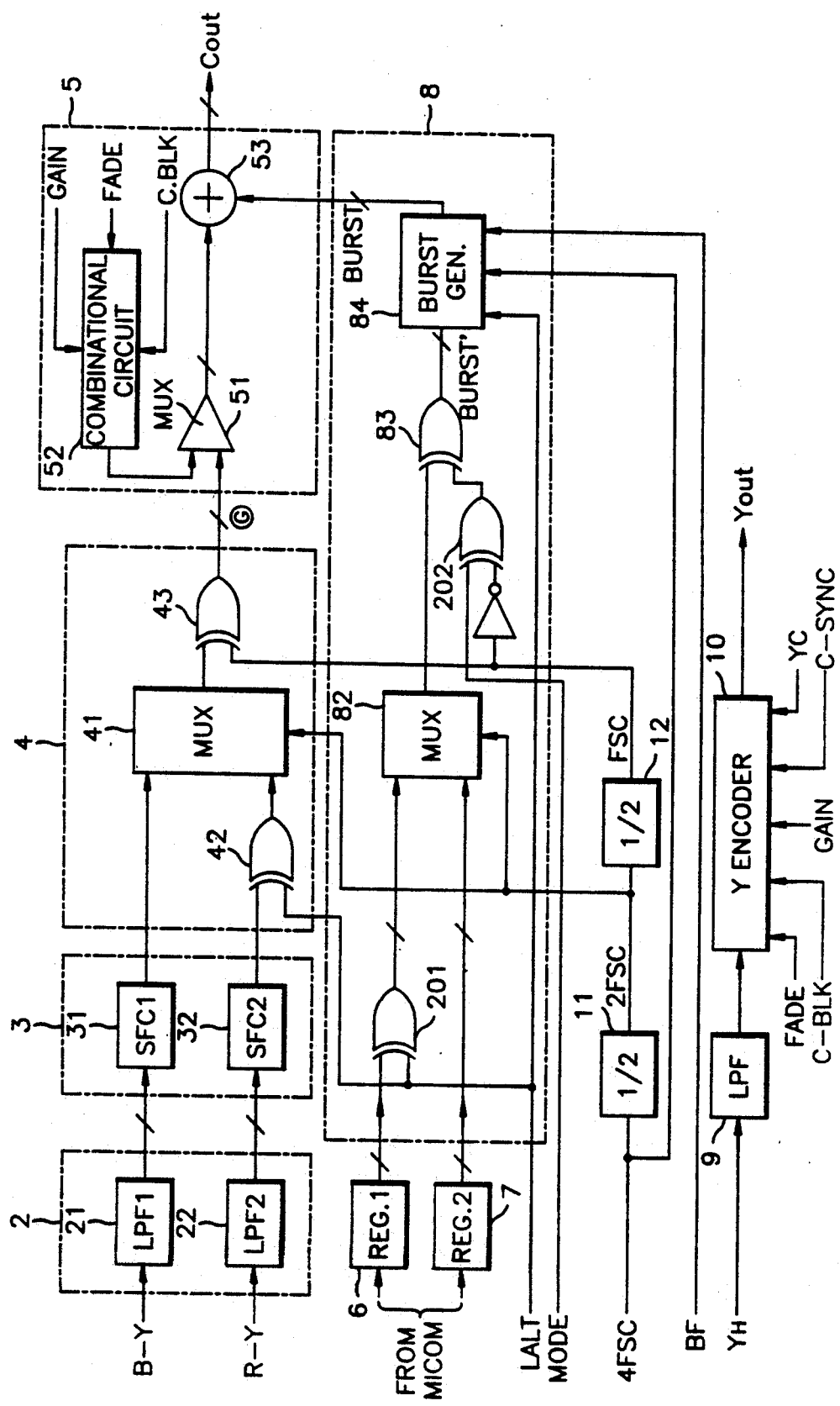
FIG. 6 is a block diagram showing another preferred embodiment of FIG. 1.

In FIG. 6, a second preferred embodiment of the digital encoder is shown. Here, an exclusive-OR gate 201 is used instead of the switch 81 of FIG. 2, and operates as a buffer or an inverter in response to the line alternate signal LALT. In addition, instead of a mode select signal MODE directly applied to the burst generating circuit 8, an exclusive-OR gate 202 is inserted at the input terminal of the exclusive-OR gate 83. The exclusive-OR gate 202 has a first input coupled to the signal MODE for selecting a mode and a second input coupled to the sub-carrier frequency signal 4FSC.

There has thus been shown and described a novel digital encoder compatible with both NTSC and PAL type systems, which fulfills all the objects and advantages sought therefor. Many changes, modifications, variations, and other uses and applications of the subject invention will, however, become apparent to those skilled in the art after considering the specification and the accompanying drawings which disclose preferred embodiments thereof. All such changes, modifications, variations, and other uses and applications which do not depart from the spirit and scope of the invention are deemed to be covered by the invention which is limited only by the claims which follow.

What is claimed is:

1. A digital encoder, comprising:
   a frequency converter for converting the frequency of color difference signals to a sub-carrier frequency;
   a modulator, coupled to said frequency converter and responsive to converted color difference signals, for determining a level and phase of said converted color difference signals in response to a first set of control signals;
   a register having phase information corresponding to a burst signal;
   a burst generator circuit, coupled to said register and responsive to said phase information, for determining a level and phase of said burst signal in response to a second set of control signals; and
   a chroma encoder, responsive to outputs of said modulator and said burst generating circuit, for generating a chrominance signal in response to a third set of control signals.

2. A digital encoder as claimed in claim 1, wherein said set first of control signals comprises a line alternate signal, a first sub-carrier frequency signal, and a second sub-carrier frequency signal.

3. A digital encoder as claimed in claim 2, wherein said second set of control signals comprises said line alternate signal, said first sub-carrier frequency signal, said second sub-carrier frequency signal, a third sub-carrier frequency signal, a burst flag signal, and a mode select signal.

4. A digital encoder as claimed in claim 2, wherein said line alternate signal is set to a predetermined logic state when said digital encoder is used in an NTSC type system.

5. A digital encoder as claimed in claim 3, wherein said line alternate signal is set to a predetermined logic state when said digital encoder is used in an NTSC type system.

6. A digital encoder as claimed in claim 2, wherein said line alternate signal alternates between a logic "low" state and a logic "high" state when said digital encoder is used in a PAL type system.

7. A digital encoder as claimed in claim 3, wherein said line alternate signal alternates between a logic "low" state and a logic "high" state when said digital encoder is used in a PAL type system.

8. A digital encoder as claimed in claim 3, wherein said modulator comprises:
   a first exclusive-OR gate for receiving a first signal of said converted color difference signals and said line alternate signal, said first exclusive-OR gate determining a level and phase of said first signal of said converted color difference signals;
   a first multiplexer, responsive to said first sub-carrier frequency signal, having first and second inputs respectively coupled to a second signal of said converted color difference signals and an output of said first exclusive-OR gate, said first multiplexer multiplexing said second signal of said converted color difference signals and said output of said first exclusive-OR gate in response to said first sub-carrier frequency signal; and
   a second exclusive-OR gate, having first and second inputs respectively coupled to an output of said first multiplexer and said first sub-carrier frequency signal, said second exclusive-OR gate determining a level and phase of said output of said first multiplexer in response to said first sub-carrier frequency.

9. A digital encoder as claimed in claim 8, wherein said first exclusive-OR gate, responsive to said line alternate signal, being configured to operate according to one of a buffer, and a buffer and an inverter alternatively.

10. A digital encoder as claimed in claim 9, wherein said second exclusive-OR gate, responsive to said first sub-carrier frequency signal, being configured to operate according to one of a buffer, and a buffer and an inverter alternatively.

11. A digital encoder as claimed in claim 8, wherein said burst generator circuit comprises:
   a switch, responsive to said line alternate signal, for switching said phase information transmitted by said register;
   a second multiplexer, having first and second inputs coupled to outputs of said switch, said second multiplexer multiplexing said outputs of said switch in response to said second sub-carrier frequency signal;

a third exclusive-OR gate, having a first input coupled to an output of said second multiplexer and a second input coupled to said first sub-carrier frequency signal; and a burst generator output circuit, coupled to an output of said third exclusive-OR gate and responsive to said line alternate signal, said third sub-carrier frequency signal, said burst flag signal, and said mode select signal, for generating said burst signal.

12. A digital encoder as claimed in claim 11, wherein said third exclusive-OR gate, responsive to said first sub-carrier frequency signal, being configured to operate according to one of a buffer, and a buffer and an inverter alternatively.

13. A digital encoder as claimed in claim 11, wherein said third set of control signals comprises a fade signal, a composite blank signal, and a gain signal.

14. A digital encoder as claimed in claim 13, wherein said chroma encoder comprises:

a combinational circuit for combining said fade signal, said composite blank signal, and said gain signal;

a fifth multiplexer, having a first input coupled to an output of said combinational circuit and a second input coupled to an output of said modulator, said fifth multiplexer multiplexing said output of said combinational circuit and said output of said modulator; and a first mixer, coupled to an output of said fifth multiplexer and said burst generator circuit, for mixing an output of said fifth multiplexer with said burst signal of said burst generator output circuit and outputing a digital chrominance signal.

15. A digital encoder as claimed in claim 14, further comprising at least one frequency divider for dividing said first sub-carrier frequency signal by a predetermined number.

16. A digital encoder as claimed in claim 15, wherein said predetermined number is two.

17. A digital encoder as claimed in claim 8, wherein said burst generator circuit comprises:

a third exclusive-OR gate, having inputs coupled to an output of said register and said line alternate signal;

a second multiplexer, having inputs coupled to an output of said third exclusive-OR gate and a second output of said register, said second multiplexer multiplexing said output of said third exclusive-OR gate and said second output of said register in response to said second sub-carrier frequency signal;

a first inverter for inverting said first sub-carrier frequency signal;

a fourth exclusive-OR gate, having first and second inputs respectively coupled to an output of said first inverter and said mode select signal;

a fifth exclusive-OR gate, having first and second inputs respectively coupled an output of said fourth exclusive-OR gate and an output of said second multiplexer; and a burst generator output circuit, coupled to an output of said fifth exclusive-OR gate and responsive to said line alternate signal, said third sub-carrier frequency signal and said burst flag signal, said burst generator output circuit generating said burst signal.

18. A digital encoder as claimed in claim 11, wherein said burst generator output circuit comprises:

a first inverter for inverting said output of said third exclusive-OR gate;

a third multiplexer, coupled to an output of said first inverter and said third exclusive-OR gate, said third multiplexer multiplexing said outputs of said first inverter and said third exclusive-OR gate in response to said line alternate signal;

a second mixer, having first and second inputs respectively coupled to an output of said third multiplexer and said third sub-carrier frequency signal, for mixing said output of said third multiplexer with said third sub-carrier frequency signal;

a fourth multiplexer, coupled to outputs of said second mixer and said first inverter and being responsive to said mode select signal, said fourth multiplexer multiplexing said outputs of said second mixer and said first inverter in response to said mode select signal;

a synchronizer for synchronizing said burst flag signal with said third sub-carrier frequency; and an AND gate, having first and second inputs respectively coupled to an output of said synchronizer and an output of said fourth multiplexer for generating said burst signal.

19. A digital encoder as claimed in claim 17, wherein said burst generator circuit comprises:

a second inverter for inverting said output of said fifth exclusive-OR gate;

a third multiplexer, coupled to an output of said second inverter and said third exclusive-OR gate, said third multiplexer multiplexing said outputs of said second inverter and said fifth exclusive-OR gate in response to said line alternate signal;

a second mixer, having first and second inputs coupled to an output of said third multiplexer and said third sub-carrier frequency signal, for mixing said output of said third multiplexer with said third sub-carrier frequency signal;

a fourth multiplexer, coupled to outputs of said second mixer and said second inverter and being responsive to said mode select signal, said fourth multiplexer multiplexing said outputs of said second mixer and said second inverter in response to said mode select signal;

a synchronizer for synchronizing said burst flag signal with said third sub-carrier frequency; and an AND gate, having first and second inputs respectively coupled to an output of said synchronizer and an output of said fourth multiplexer for generating said burst signal.

* * * * *